3,591,370
DENTAL ALLOY
André Denéréaz, London, England, assignor to The Amalgamated Dental Company Limited, London, England
No Drawing. Filed Oct. 4, 1968, Ser. No. 764,996
Claims priority, application Great Britain, Oct. 24, 1967, 48,205/67
Int. Cl. C22c 5/00, 7/00
U.S. Cl. 75—169      14 Claims

ABSTRACT OF THE DISCLOSURE

A new dental alloy comprises silver, tin, copper, nickel and indium, suitably 65 to 75% by weight of silver, 23 to 29% by weight of tin, up to 6% by weight of copper, 0.1 to 2% by weight of nickel and 0.1 to 2% by weight of indium. The alloy may contain mercury in an amount of up to 3% by weight.

---

This invention is concerned with improvements in or relating to dental alloys.

Conventional dental alloys, which are used in the form of an amalgam with mercury for filling cavities in teeth, generally comprise silver-tin alloys containing small amounts of copper and zinc. The zinc is incorporated into the alloy in order to improve the workability and cleanliness of the amalgam of the alloy with mercury during trituration and condensation. However, a zinc-containing dental alloy suffers from the disadvantage that it undergoes delayed or secondary expansion if water becomes incorporated into an amalgam of the alloy and mercury during, for example, mixing or packing; that is the amalgam expands in volume by an unacceptable amount if the alloy becomes contaminated with water. Further, the action of water upon an amalgam of a zinc-containing dental alloy and mercury leads to undesirable corrosion of the amalgam.

However, if zinc is omitted from a dental alloy other disadvantages manifest themselves. Thus, the amalgam of the zinc-free alloy with mercury becomes more critical in manipulation. It may not withstand unavoidable abuse during manipulation without shrinkage. A second disadvantage in the use of zinc-free dental alloy lies in the fact that a freshly prepared amalgam of a zinc-free dental alloy and mercury tends to blacken or otherwise discolour materials with which it comes into contact. It is believed that this blackening is due to oxidation of the tin-mercury amalgam, which oxidation is hindered by the use of zinc which acts as a reducing agent and hence reduces or eliminates the blackening.

It has now been found that an improved dental alloy, for amalgamation with mercury may be prepared by replacing zinc with nickel and indium.

According to the invention, therefore, there is provided a dental alloy comprising silver, tin, copper, nickel and indium.

The dental alloy according to the invention, in general, possesses the advantages of a zinc-containing dental alloy in regards of workability and reduced tendency to blackening and also possesses the advantage that it is very much less susceptible to the action of water, when amalgamated with mercury, that is a corresponding zinc-containing dental alloy, that is the dental alloy of the composition, when amalgamated with mercury, and exposed to the effects of water has a reduced tendency to undergo secondary expansion and a reduced tendency to corrode.

Whilst the invention is applicable to all silver-tin dental alloys, the dental alloys of the invention should preferably conform to the well recognised international specifications. The dental alloys of the invention will generally comprise a major proportion of silver and tin and minor proportions of copper, nickel and indium. Thus, a dental alloy according to the invention may suitably comprise at least 65% by weight of silver, preferably from 65 to 75% by weight of silver; not more than 29% by weight of tin, preferably from 23 to 29% by weight of tin, not more than 6% by weight of copper, not more than 2% by weight of nickel, preferably from 0.1 to 2% by weight of nickel; and not more than 2% by weight of indium, preferably from 0.1 to 2% by weight of indium.

The dental alloys of the invention may be prepared by conventional alloying techniques i.e. by fusing the components together, and are conveniently supplied to the user in particulate form. Thus, the dental alloy may be supplied as a powder, filing or light particles of the alloy or in the form of loosely compressed tablets of such particulate material. When the alloy is supplied to the user in powder form it will be formed into an amalgam by the user by amalgamation with mercury.

However, if desired, the dental alloys of the invention may be supplied in the form of amalgams with mercury containing for example up to 3% by weight of mercury, and such amalgams form a further feature of the present invention.

In order that the invention may be well understood, the following examples of alloys according to the invention are given by way of illustration only. In the examples all percentages are by weight.

EXAMPLE 1

| | Percent |
|---|---|
| Silver | 72.0 |
| Copper | 1.0 |
| Tin | 25.0 |
| Nickel | 1.0 |
| Indium | 1.0 |
| Total | 100.0 |

EXAMPLE 2

| | Percent |
|---|---|
| Silver | 68.0 |
| Copper | 5.0 |
| Tin | 26.0 |
| Nickel | 0.5 |
| Indium | 0.5 |
| Total | 100.0 |

EXAMPLE 3

| | Percent |
|---|---|
| Silver | 67.0 |
| Copper | 5.0 |
| Tin | 25.5 |
| Nickel | 0.5 |
| Indium | 0.75 |
| Mercury | 1.25 |
| Total | 100.0 |

EXAMPLE 4

| | Percent |
|---|---|
| Silver | 68.0 |
| Copper | 5.0 |
| Tin | 24.0 |
| Nickel | 0.6 |
| Indium | 0.4 |
| Mercury | 2.0 |
| Total | 100.0 |

The alloys of the above examples are suitable for amalgamation with mercury in, for example, a weight ratio of alloy to mercury of from 5:5 to 5:8.

I claim:
1. A dental alloy consisting essentially of at least 65% by weight of silver, an operable amount up to 29% by weight of tin, not more than 6% by weight of copper, an operable amount up to 2% by weight of nickel and an operable amount up to 2% by weight of indium.
2. The dental alloy according to claim 1 wherein the silver ranges from 65 to 75% by weight.
3. The dental alloy according to claim 1 wherein the tin ranges from 23 to 29% by weight.
4. The dental alloy according to claim 1 wherein the nickel ranges from 0.1 to 2% by weight.
5. The dental alloy according to claim 1 wherein the indium ranges from 0.1 to 2% by weight.
6. The dental alloy according to claim 1 being in particulate form.
7. The dental alloy according to claim 1 being in the form of loosely compressed tablets of particles of the alloy.
8. The dental alloy according to claim 1 in combination with mercury in the form of an amalgam.
9. The dental alloy as claimed in claim 8 wherein the mercury ranges from an operable amount up to 3% by weight.
10. The dental alloy according to claim 1 consisting essentially of:

| | Percent by wt. |
|---|---|
| Silver | 72.0 |
| Copper | 1.0 |
| Tin | 25.0 |
| Nickel | 1.0 |
| Indium | 1.0 |

11. The dental alloy according to claim 1 consisting essentially of:

| | Percent by wt. |
|---|---|
| Silver | 68.0 |
| Copper | 5.0 |
| Tin | 26.0 |
| Nickel | 0.5 |
| Indium | 0.5 |

12. The dental alloy according to claim 8 consisting essentially of:

| | Percent by wt. |
|---|---|
| Silver | 67.0 |
| Copper | 5.0 |
| Tin | 25.5 |
| Nickel | 0.5 |
| Indium | 0.75 |
| Mercury | 1.25 |

13. The dental alloy according to claim 8 consisting essentially of:

| | Percent by wt. |
|---|---|
| Silver | 68.0 |
| Copper | 5.0 |
| Tin | 24.0 |
| Nickel | 0.6 |
| Indium | 0.4 |
| Mercury | 2.0 |

14. The dental alloy according to claim 8 wherein the weight ratio of mercury to the rest of the alloy is from 5:5 to 8:5.

References Cited

UNITED STATES PATENTS

| | | | |
|---|---|---|---|
| 1,574,714 | 2/1926 | Vogt | 75—173 |
| 1,612,782 | 12/1926 | Vogt et al. | 75—169X |
| 1,959,668 | 5/1934 | Gray | 75—169 |
| 2,698,231 | 12/1954 | Schulze et al. | 75—173 |
| 3,305,356 | 2/1967 | Youdelis | 75—134 |

FOREIGN PATENTS

| | | | |
|---|---|---|---|
| 1,219,712 | 5/1960 | France | 75—169 |
| 186,945 | 7/1907 | Germany | 75—169 |

L. DEWAYNE RUTLEDGE, Primary Examiner

E. L. WEISE, Assistant Examiner

U.S. Cl. X.R.

75—173R, 173C